April 11, 1950        H. J. LYNCH ET AL        2,503,281
SWIVEL JOINT
Filed Jan. 5, 1948
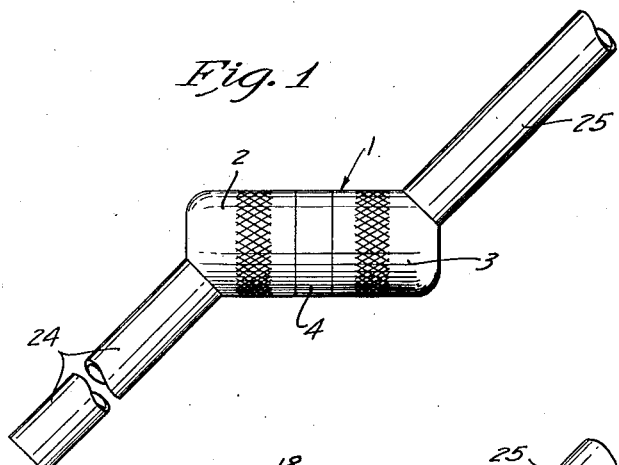
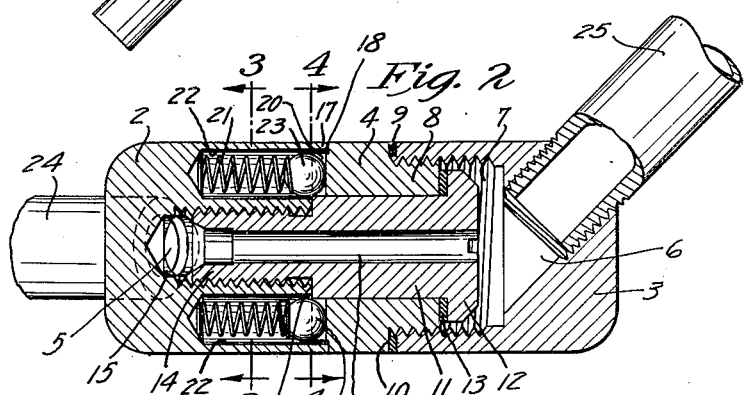
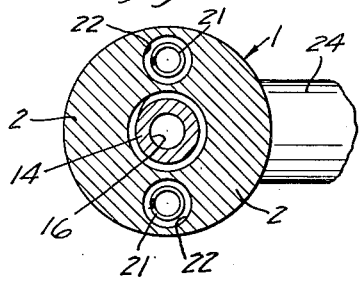
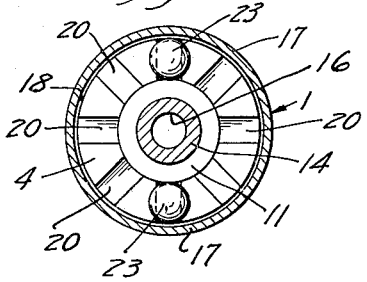
*Inventors*
*Henry J. Lynch*
*Mikeal G. Bystrom*
*By their Attorneys*
*Merchant & Merchant*

Patented Apr. 11, 1950

2,503,281

UNITED STATES PATENT OFFICE 2,503,281

SWIVEL JOINT

Henry J. Lynch and Mikeal G. Bystrom, Minneapolis, Minn., assignors to Lynch Automatic Products Co., Minneapolis, Minn., a corporation of Minnesota Application January 5, 1948, Serial No. 542

2 Claims. (Cl. 285—97.6)

Our invention relates to swivel joints for fluid pipe lines and is particularly adapted for use in grease or lubricating lines.

The primary object of our invention is the provision of a novel swivel of the type immediately above described, which is inexpensive to manufacture, rugged in construction, durable in use, and which, when interposed in a high-pressure grease line, will greatly facilitate the application of the line to even the most inaccessible fittings.

The above and still further objects and advantages of our invention will become apparent from the following detailed specification, appended claims, and attached drawings.

Referring to the drawings, wherein like characters indicate like parts throughout the several views:

Fig. 1 is a view in side elevation of our novel swivel applied to a high-pressure grease line;

Fig. 2 is a view in axial section of our novel swivel on an enlarged scale;

Fig. 3 is a transverse section taken on the line 3—3 of Fig. 2; and

Fig. 4 is a transverse section taken on the line 4—4 of Fig. 2.

Referring with greater particularity to the drawings, the numeral 1 indicates, in its entirety, a tubular casing comprising spaced end sections 2 and 3 and an intermediate section 4. End section 2 is provided with an opening 5 in its outer end, whereas end section 3 is provided with an opening or passage 6 in its outer end. Either of the openings 5 or 6 could serve as an inlet or an outlet passage.

Referring particularly to Fig. 2, it will be observed that passage 6 in casing section 3 extends angularly from one edge thereof into an axially-extended cavity 7, which is internally threaded to receive a diametrically-reduced threaded sleeve 8 on the intermediate section 4. A sealing washer 9 is interposed between the inner end of the section 3 and an adjacent shoulder 10 on the intermediate section 4 to prevent fluid from escaping therethrough. A tubular sleeve 11 is journalled for rotation within the intermediate casing section 4 and has an enlarged head 12 at one end which is free to rotate within the cavity 7 of the end casing section 3. A thrust washer 13 is interposed between the head 12 of the tubular sleeve 11 and the end of the threaded sleeve 8. A diametrically-reduced axially-extended end portion 14 of the tubular sleeve 11 has threaded engagement with a co-axially-extended cavity 15 in the end casing section 2.

The axially-extended passage 16 in the sleeve 11 connects the passage 6 in the casing element 3 with the passage 5 in the casing element 2. It will here be noted that passage 5 in element 2 extends outwardly from the cavity 15 at approximately the same angle as that of passage 6.

Referring particularly to Fig. 2, it will be seen that casing end section 2 is provided with a circumferentially-extending axially-projecting skirt 17 which is adapted to fit rather loosely into a circumferential notch or recess 18 in the intermediate section 4. To prevent binding between the skirt 17 and the intermediate section 4, so as to allow free rotation therebetween, we provide a shoulder 19 on the tubular sleeve 11 which projects axially outwardly of the intermediate casing section 4 and has abutting engagement with the inner end of the casing section 2. The actual projection of the shoulder 19 is very slight amounting only to a few $1/1000$ of an inch, and the length of the annular skirt 17 is less than the depth of the annular recess 18 so that there is no binding at this point which would interfere with the free rotation of the end casing section 12 with respect to the intermediate section 4.

A plurality of recesses 20 in the form of circumferentially-spaced radially-extending grooves are provided in the end wall of the section 4 adjacent the end section 2. A pair of coil compression springs 21 are contained within axially-extended diametrically-opposed bores 22 drilled into the inner end of the casing section 2. The bored holes 22 are axially-aligned with and are adapted to communicate each with any one of the recesses 20 in the casing section 4 upon rotation of the casing section 2 with respect to the section 4. A pair of steel balls 23 are contained within the bores 22 and are yieldingly biased toward engagement with the recesses 20 of the casing section 4. In other words, the balls 23 are in the nature of spring pressed detents which, by their engagement with the recesses 20, tend to prevent free rotation of the end section 2 with respect to the intermediate section 4 but permit rotation therebetween when sufficient turning force is applied thereto.

A coupling 24 may be connected to either of the passages 5 and 6, and a pipe line 25 may be connected to the opposite one thereof. Coupling 24 is of conventional design and adapted for use with customary lubrication fittings. It should be obvious that, with our novel swivel interposed in a grease line, it is possible to curve the line as desired, thus making it possible to apply a coupling to fittings which normally are reached only with special instruments; a fortiori when two or more of my novel swivels are used in tandem arrangement.

What we claim is:

1. In a device of the class described, a swivel joint for pipe lines comprising a tubular casing having inlet and outlet openings in opposite ends thereof, said casing comprising spaced end and intermediate sections, said intermediate section being tightly secured to one of said end sections and having abutting rotatable relationship with the other end section, an axial tubular sleeve connecting said inlet and discharge openings within said casing and journalled for rotation in said intermediate section, said sleeve having an enlarged head on one end which engages the intermediate section and being tightly secured at its other end to the other of said end sections, said other end section being provided with an axially-extended inwardly-opening bore which is radially offset from the tubular sleeve and which is adapted to be aligned with any one of a plurality of circumferentially-spaced recesses in the adjacent end of said intermediate section, and in further combination with a spring pressed detent in said bore adapted to be seated in the recesses upon rotation of said other end section with respect to said intermediate section.

2. In a device of the class described, a swivel joint for pipe lines comprising a tubular casing having inlet and outlet openings in opposite ends thereof, said casing comprising spaced end and intermediate casing sections, said intermediate section being removably secured to one of said end sections and having abutting rotatable relationship with the intermediate section, a tubular axial sleeve connecting said inlet and discharge openings within said casing and journalled for rotation in said intermediate section, said sleeve having an enlarged head on one end which engages the intermediate section and is removably secured at its other end to the other of said end sections, a plurality of circumferentially-spaced axially-extending inwardly-opening bores in said other end section, a plurality of circumferentially-spaced recesses in the end of said intermediate section adjacent said other end section, and spring pressed detent acting balls in the said bores adapted to be seated in said recesses upon rotation of said other end section with respect to said intermediate section.

HENRY J. LYNCH.
MIKEAL G. BYSTROM.

REFERENCES CITED

The following references are of record in the file of this patent:

FOREIGN PATENTS

| Number | Country | Date |
|---|---|---|
| 258,664 | Great Britain | Sept. 27, 1926 |